(12) United States Patent
Hausladen

(10) Patent No.: US 6,549,176 B2
(45) Date of Patent: Apr. 15, 2003

(54) RFID TAG HAVING INTEGRAL ELECTRICAL BRIDGE AND METHOD OF ASSEMBLING THE SAME

(75) Inventor: Michael C. Hausladen, Amherst, NY (US)

(73) Assignee: Moore North America, Inc., Grand Island, NY (US)

(*) Notice: Subject to any disclaimer, the term of this patent is extended or adjusted under 35 U.S.C. 154(b) by 9 days.

(21) Appl. No.: 09/929,123

(22) Filed: Aug. 15, 2001

(65) Prior Publication Data

US 2003/0033713 A1 Feb. 20, 2003

(51) Int. Cl.⁷ ................................................. H01Q 1/36
(52) U.S. Cl. .................. 343/895; 340/572.1; 340/572.7
(58) Field of Search .......................... 340/572.7, 572.8, 340/572.1; 343/700 MS, 878, 895, 873

(56) References Cited

U.S. PATENT DOCUMENTS

| | | |
|---|---|---|
| 1,647,474 A | 11/1927 | Seymour |
| 2,874,360 A | 2/1959 | Eisler .......................... 336/200 |
| 2,943,966 A | 7/1960 | Leno et al. .................... 154/80 |
| 3,002,260 A | 10/1961 | Shortt et al. ................ 29/155.5 |
| 3,235,942 A | 2/1966 | Howell et al. ............. 29/155.5 |
| 3,560,904 A | 2/1971 | Wilkes ........................ 336/180 |
| 4,313,151 A | 1/1982 | Vranken ..................... 361/402 |
| 4,313,152 A | 1/1982 | Vranken ..................... 361/402 |
| 4,369,557 A | 1/1983 | Vandebult ................... 29/28.42 |
| 4,578,654 A | 3/1986 | Tait ............................. 333/175 |
| 4,591,814 A | 5/1986 | Ito et al. ..................... 333/177 |
| 4,658,264 A | 4/1987 | Baker .......................... 343/895 |
| 4,876,555 A | 10/1989 | Jorgensen ................... 343/895 |
| 5,105,172 A | 4/1992 | Khatibzabeh et al. ....... 333/175 |
| 5,508,684 A | 4/1996 | Becker ........................ 340/572 |
| 5,541,399 A | 7/1996 | De Vall ...................... 235/491 |
| 5,844,451 A | 12/1998 | Murphy ...................... 333/185 |
| 6,049,461 A | 4/2000 | Harghiri-Tehrani et al. . 361/737 |
| 6,069,564 A * | 5/2000 | Hatano et al. ........... 340/572.7 |
| 6,335,686 B1 * | 1/2002 | Goff et al. ............... 340/572.4 |
| 6,424,263 B1 * | 7/2002 | Lee et al. ................ 340/572.7 |

* cited by examiner

Primary Examiner—Don Wong
Assistant Examiner—Shih-Chao Chen
(74) Attorney, Agent, or Firm—Nixon & Vanderhye P.C.

(57) ABSTRACT

A radio frequency-identification (RFID) tag comprises a substrate, a single, continuous antenna having a plurality of spiral turns and end portions that are integral with the spiral turns, and an integrated circuit. The spiral turns are disposed on the substrate and at least one of the end portions crosses over at least some of the spiral turns. One end portion of the antenna is integrally connected to the innermost spiral turn and extends toward an outermost spiral turn to cross over at least some of the spiral turns. Another end portion of the antenna may be integrally connected to the outermost spiral turn and extend toward the innermost spiral turn to cross over at least some of the other spiral turns. The end portion (s) may cross over the spiral turns on the side of the substrate on which the spiral turns are disposed or on the opposite side.

30 Claims, 15 Drawing Sheets

RFID TAG HAVING INTEGRAL ELECTRICAL BRIDGE AND METHOD OF ASSEMBLING THE SAME

BACKGROUND OF THE INVENTION

1. Field of the Invention

The present invention relates to a tag having an enclosed radio frequency identification (RFID) inlay and a method of making the same. More specifically, the present invention relates to an RFID inlay that includes an antenna having an integrally manufactured end portion which forms an electrical bridge over spiral turns of the antenna.

2. Background of Related Art

The use of a tag having an RFID inlay as part of an RFID system to identify and monitor objects is well known in the art. In particular, a reader of a conventional RFID system produces and emits an electromagnetic interrogation field at a specific frequency when excited by connected electronic drive circuitry. If a tag having an RFID inlay is positioned within the interrogation field for a sufficient time, the RFID inlay will become stimulated and transmit a uniquely coded signal that is received by the reader or a separate receiving antenna.

A typical RFID inlay includes an antenna and an integrated circuit (IC) chip connected to the antenna. One known antenna pattern of an RFID inlay is one that comprises of a plurality of turns that spiral around on a planar substrate (e.g., see U.S. Pat. No. 5,541,399—de Vall (1996)). A problem with this known pattern is that an electrical bridge must be formed over the spiral turns of the antenna in order for the two ends of the antenna to be electrically connected to an IC chip. This bridge is typically formed using one of the following methods: (1) using the IC chip as the bridge, or (2) connecting an additional (separate) electrical conductor to form the bridge. The IC chip or the additional electrical conductor forming the bridge is positioned on the same side of the substrate on which the antenna is mounted or on the opposite side. The IC chip is sometimes mounted on the additional electrical conductor forming the bridge.

In either of the two methods (1) or (2) noted above, the required manufacturing is relatively complex and costly. For example, if an additional electrical conductor is used to form the bridge, the conductor must be properly aligned and connected to on both of its ends.

Accordingly, there remains a need for an improved solution to this long-standing problem. The RFID antenna of the present invention fills this need by requiring a less costly and complex construction.

SUMMARY OF THE INVENTION

In an exemplary embodiment of the present invention, a radio frequency identification (RFID) tag (and a method of assembling the same) comprises a substrate, an integrated circuit, and a single, continuous antenna having a plurality of spiral turns and an end portion that is integral with the spiral turns. The spiral turns of the antenna are disposed on the substrate and the end portion crosses over at least one of the spiral turns. A non-conductive insulation may be arranged between the end portion and the at least one spiral turn that the end portion crosses. An electrical trace may be disposed on the substrate adjacent to an outermost spiral turn of the antenna. The end portion may be integrally connected to an innermost spiral turn and extend toward an outermost spiral turn to cross over substantially all of the spiral turns and connect to one end of the electrical trace. The other end of the electrical trace may be connected to the integrated circuit.

By forming the end portion as an integral part of a single, continuous antenna, the RFID tag can be manufactured at a reduced cost. A separate electrical bridge that crosses over spiral turns of the antenna does not have to be manufactured, cut, placed and electrically connected to the antenna. Since one side of the end portion is already integrally connected with the spiral turns, the number of electrical connections that need to be made are reduced. Furthermore, aligning an integral end portion as a bridge is easier than aligning a separately constructed bridge since it is already connected on one side.

In another exemplary embodiment of the present invention, a radio frequency identification (RFID) tag comprises a substrate, an integrated circuit and a continuous antenna including a plurality of spiral turns, a first end portion and a second end portion. The first and second end portions are integral with the spiral turns and the spiral turns of the antenna are disposed on the substrate. The first end portion crosses over at least a first one of the spiral turns, and a second end portion crosses over at least a second one of the plurality of spiral turns. The first end portion may be integrally connected to an innermost spiral turn of the antenna and extend toward an outermost spiral turn of the antenna. The second end portion may be integrally connected to an outermost spiral turn of the antenna and extend toward an innermost spiral turn of the antenna. In one further exemplary embodiment in which the end portions are folded over on the side of the substrate on which the spiral turns are disposed, non-conductive insulation is arranged between the first end portion and the at least a first one of the spiral turns and between the second end portion and the at least a second one of the spiral turns. Non-conductive insulation may also be arranged between the integrated circuit and at least some of the spiral turns. In another further exemplary embodiment, the first end portion crosses over the at least a first one of the spiral turns on the side of the substrate on which the spiral turns of the antenna are not disposed and the second end portion crosses over the at least a second one of the spiral turns on the side of the substrate on which the spiral turns of the antenna are not disposed. The integrated circuit is disposed on the side of the substrate on which the spiral turns of the antenna are not disposed and is connected to both the first and second end portions.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1A:
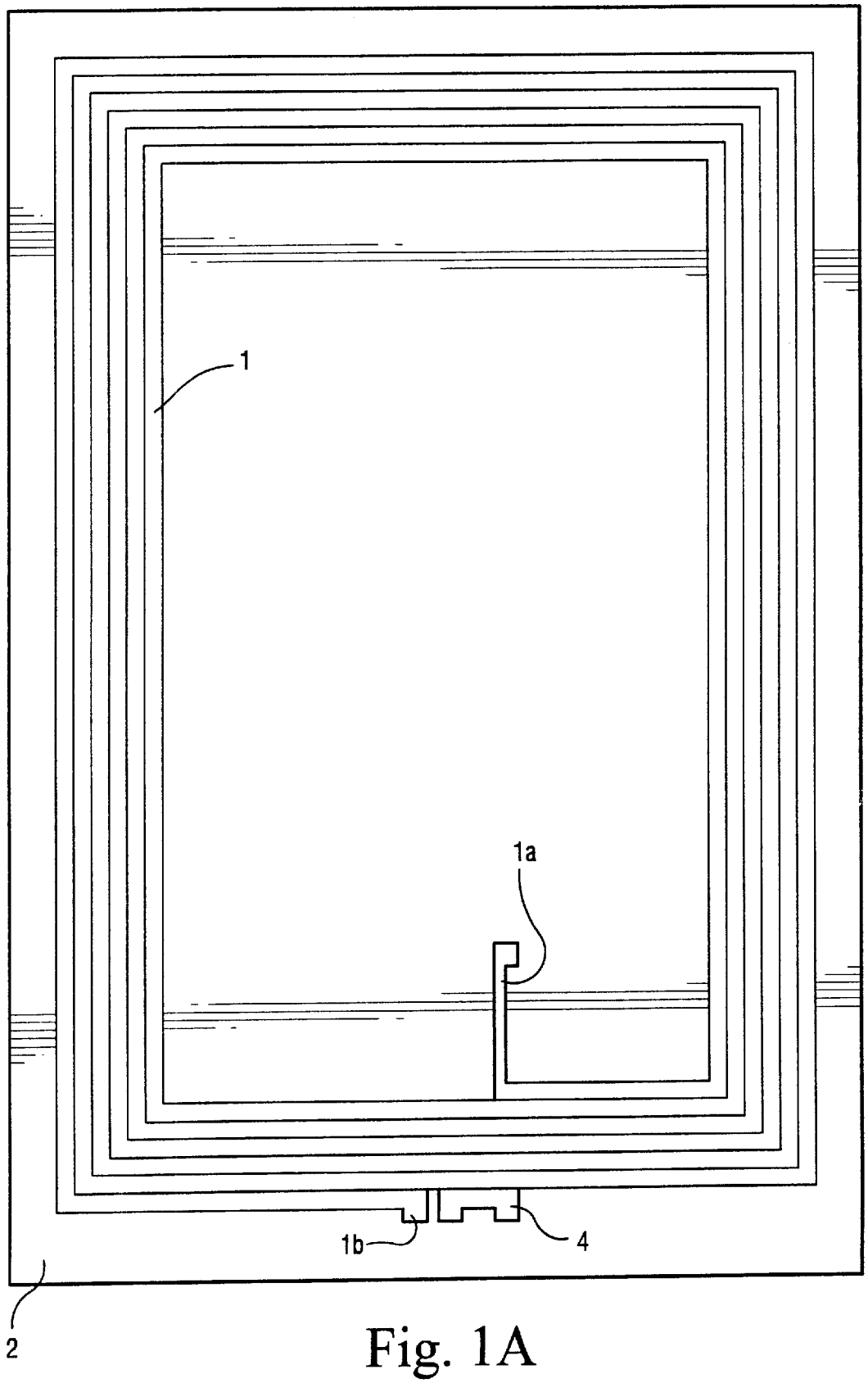
FIGS. 1A–1D illustrate plan views of an RFID inlay as it is constructed in accordance with an exemplary embodiment of the present invention.
Figure 1B:
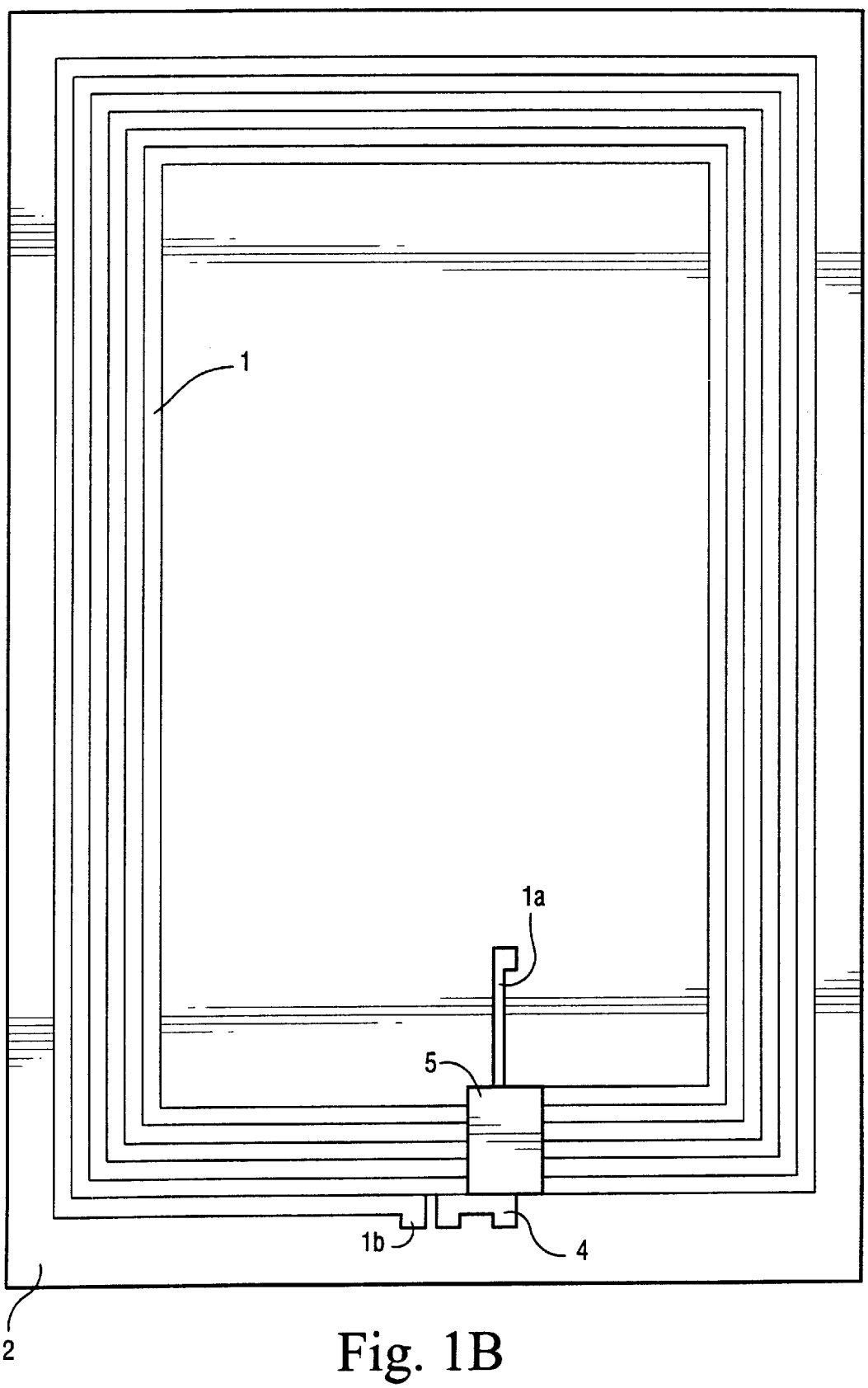
Figure 1C:
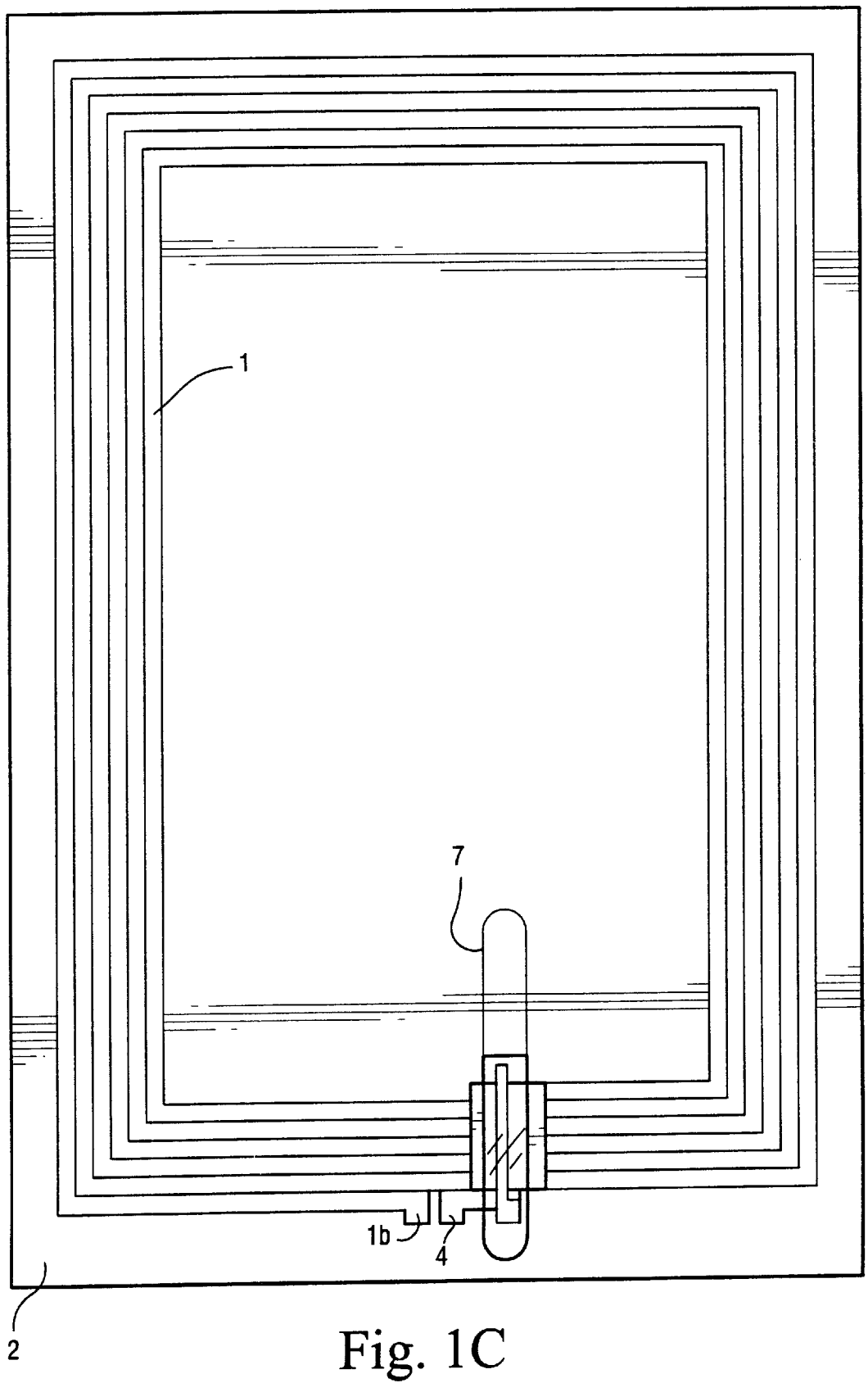
Figure 1D:
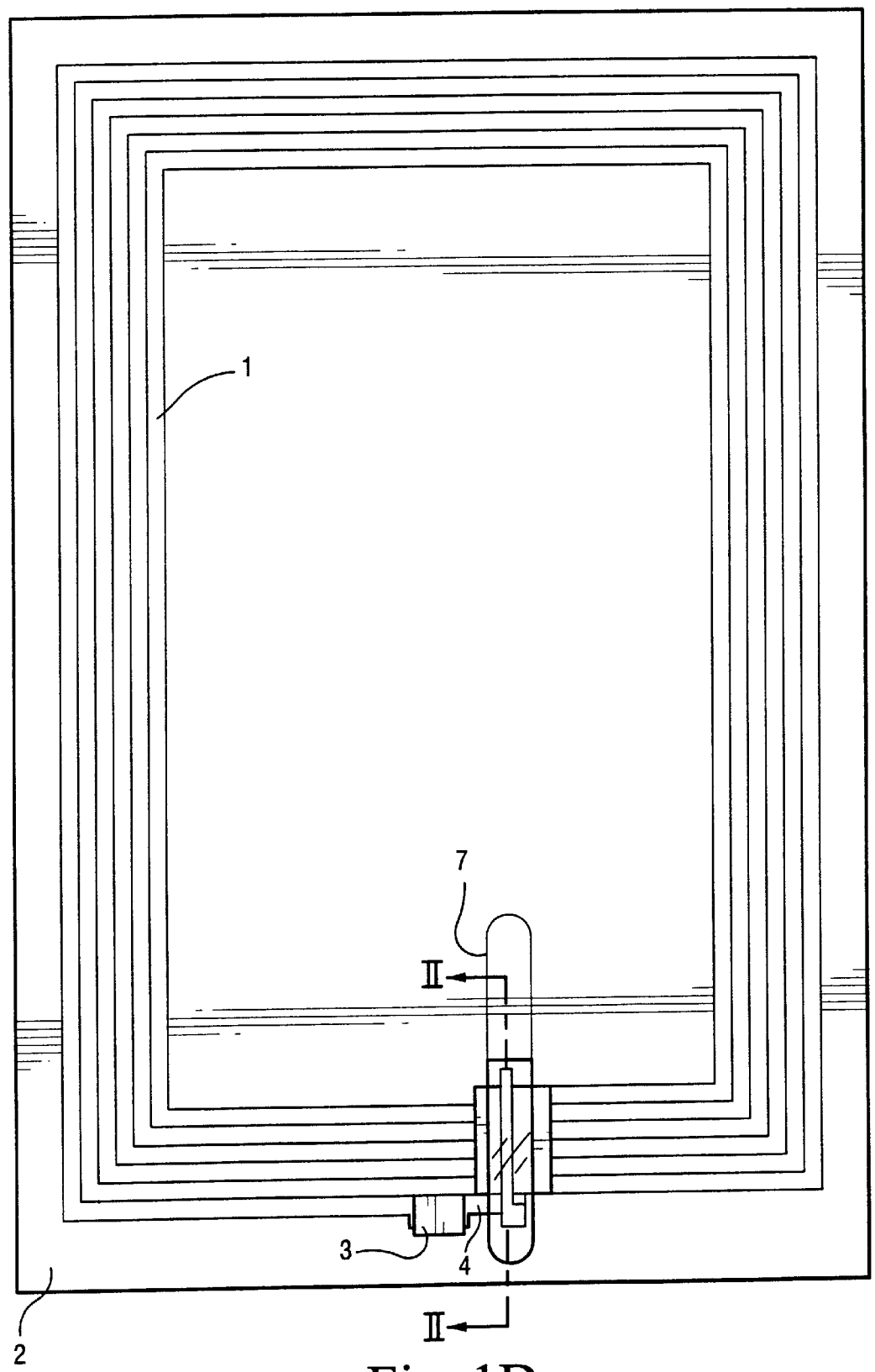
Figure 2:
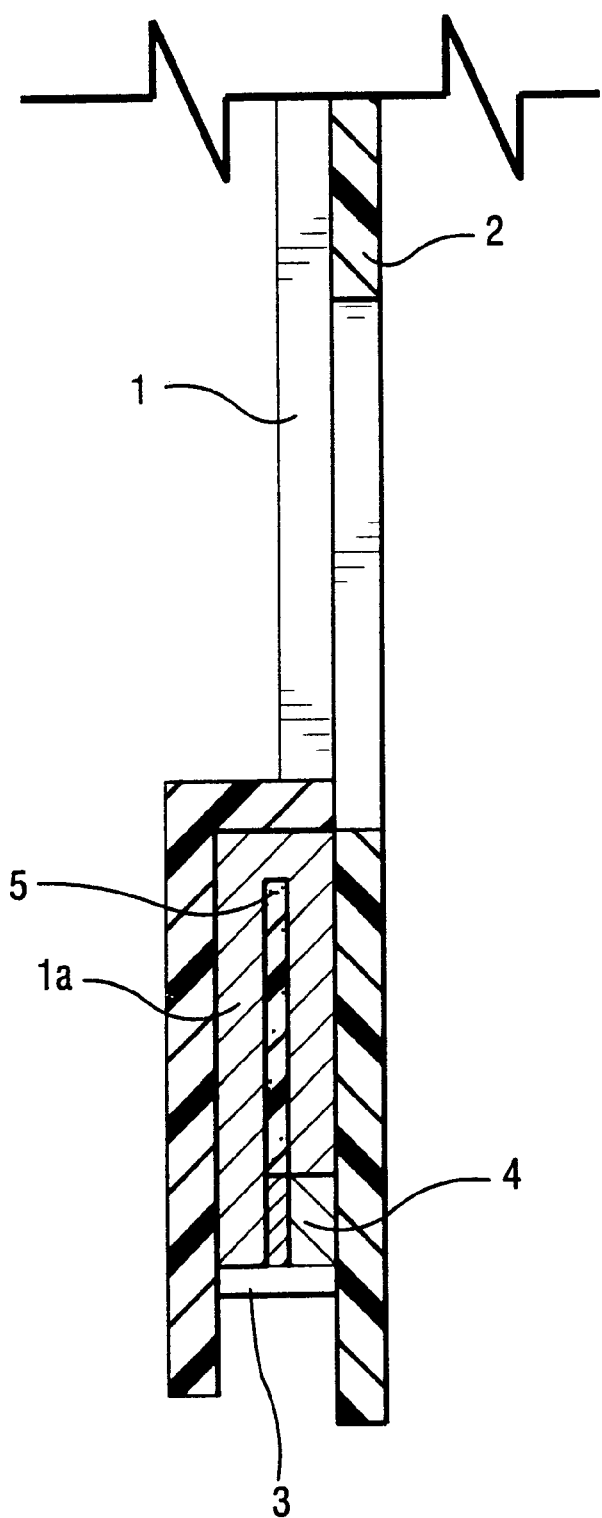
FIG. 2 is a cross-sectional view along section line II—II of FIG. 1D.

FIGS. 1A–1D and 2 illustrate a method of constructing an RFID inlay in accordance with an exemplary embodiment of the present invention. The completed RFID inlay illustrated in FIGS. 1D and 2 is enclosed in a tag as part of a RFID system. In use, the RFID inlay will resonate when it is positioned within an interrogation field having a specific frequency (e.g., 13.56 MHz) from an RFID reader and transmit a coded signal for reception by an antenna (either the reader or another antenna) of the RFID system.

The completed RFID inlay includes an antenna 1 and an IC chip 3 electrically connected to the antenna 1. The IC chip 3 contains receiver circuitry and logic that enable the coded signal to be transmitted in response to the interrogation field. The antenna 1 and the IC chip 3 are disposed on a substrate 2. The antenna 1 includes a plurality of spiral turns, a first end portion 1a and a second end portion 1b. The end portion 1b of the antenna 1 is directly connected to the IC chip 3. The IC chip 3 is also directly connected to one end of an electrically conductive trace 4 disposed on the substrate 2. The other end of the trace 4 is directly connected to the first end portion 1a of the antenna 1. The end portion 1a of the antenna 1 crosses over the antenna's spiral turns and is separated from the spiral turns by a non-conductive insulator 5.

As illustrated in FIG. 1A, the first step in constructing the RFID inlay according to an exemplary embodiment of the present invention is to dispose (e.g., print or etch) the electrically conductive antenna 1 onto the substrate 2. The material forming the substrate 2 is preferably a transparent polyamide or polyester. The end portions of 1a, 1b of the antenna 1 are integrally formed with the antenna's spiral turns. The antenna 1 including the end portions 1a, 1b and spiral turns thus form a single, continuous trace in which the end ortion 1a is integrally connected with innermost spiral turn and the end ortion 1b is integrally connected with the outermost spiral turn.

As illustrated in FIG. 1B, the non-conductive insulator 5 is applied over a portion of the spiral turns of the antenna 1. For example, a non-conductive adhesive such as a pressure sensitive adhesive (PSA) or an anisotropic adhesive is applied on the portion of the spiral turns. Alternatively, the non-conductive insulator 5 is painted or coated with a polymer on the portion of the spiral turns.

As illustrated in FIG. 1C, the end portion 1a of the antenna 1 is either completely cut out or partially punched out (see, e.g., lines 7) and folded over the spiral turns of the antenna 1 starting from the innermost spiral turn with which the end portion 1a is integrally connected. The end portion 1a is thus folded so that it crosses the spiral turns in a radially outward direction so that a pad at the very end of the end portion 1a is adjacent to one end of the trace 4. When the end portion 1a is folded, the portion of the substrate 1 which is completely or partially cut through is folded along with the end portion 1a. The end portion 1a is folded onto the side of the substrate 2 on which the spiral turns are disposed. The non-conductive insulator 5 is arranged between the folded end portion 1a and the spiral turns that are crossed by the end portion 1a to prevent a short in the antenna 1. After the end portion 1a is folded, the pad of the end portion 1a is directly connected to one end of the trace 4 by a small of amount of conductive adhesive or solder.

As illustrated in FIGS. 1D and 2, the construction of the RFID inlay is completed by installing the IC chip 3. Specifically, the IC chip 3 is directly connected to the end portion 1b of the antenna 1 and to the other end of the trace 4. The connections are preferably made using a conductive adhesive or solder. An additional "underfill" adhesive may also be used.

By folding the end portion 1a over the spiral turns of the antenna 1, the end portion 1a forms an electrical bridge over the spiral turns to enable the innermost spiral turn to be connected to the IC chip 3. A separate bridge therefore does not need to be manufactured, cut, placed and electrically connected to the antenna. Since the end portion 1a is integrally connected to the spiral turns of the antenna, the number of required connections is reduced during the manufacturing process of the RFID inlay. The bridge formed by end portion 1a may also be aligned with greater ease because it is attached on one side.

FIGS. 3A–3D and 4 illustrate a method of constructing an RFID inlay in accordance with another exemplary embodiment of the present invention. Elements which are the same or similar in nature are labeled using the same reference numerals in previous embodiment(s). Only the differences from previous embodiment(s) will be discussed in detail.

Figure 3A:
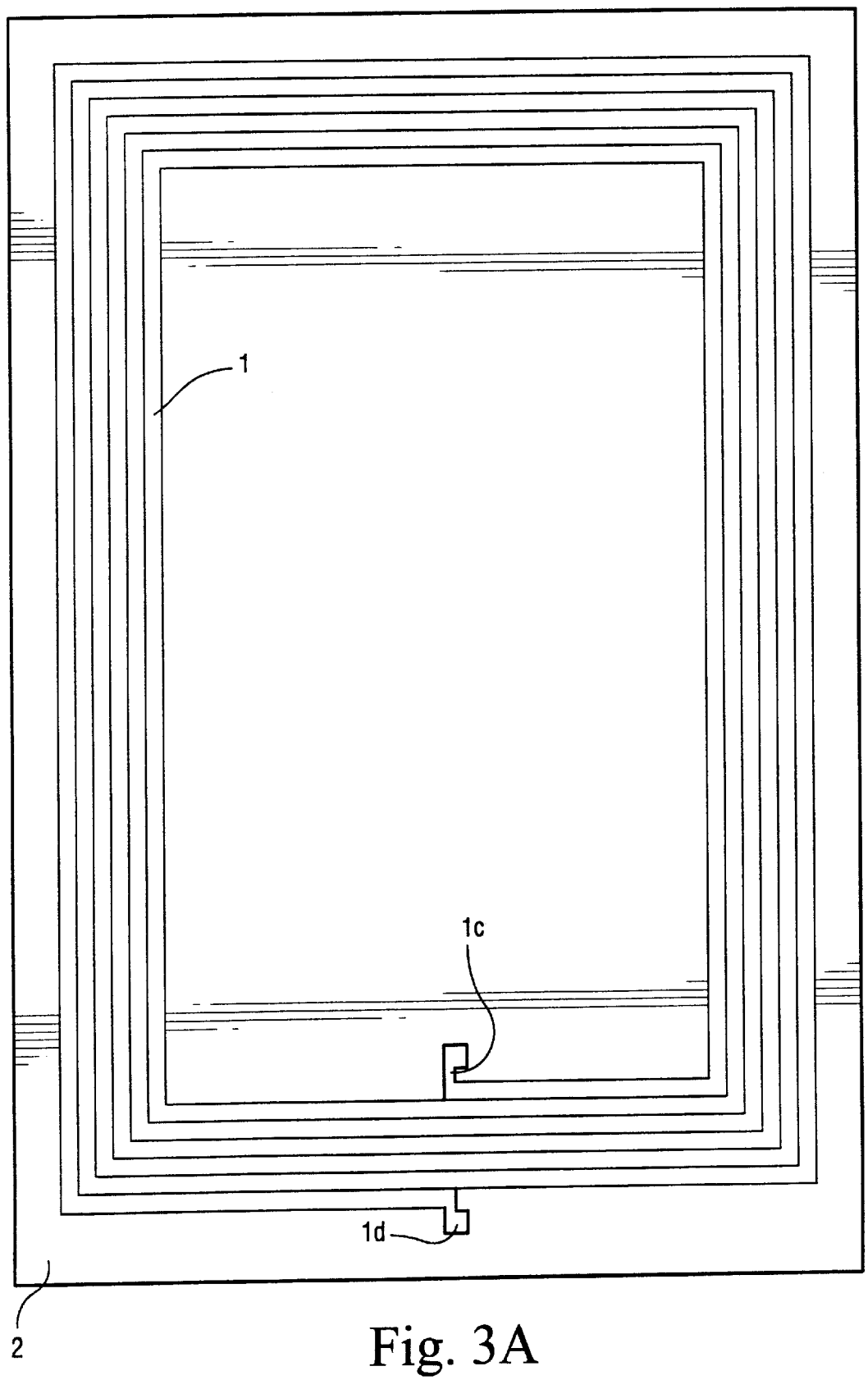
FIGS. 3A–3D illustrate plan views of an RFID inlay as it is constructed in accordance with an exemplary embodiment of the present invention.
Figure 3B:
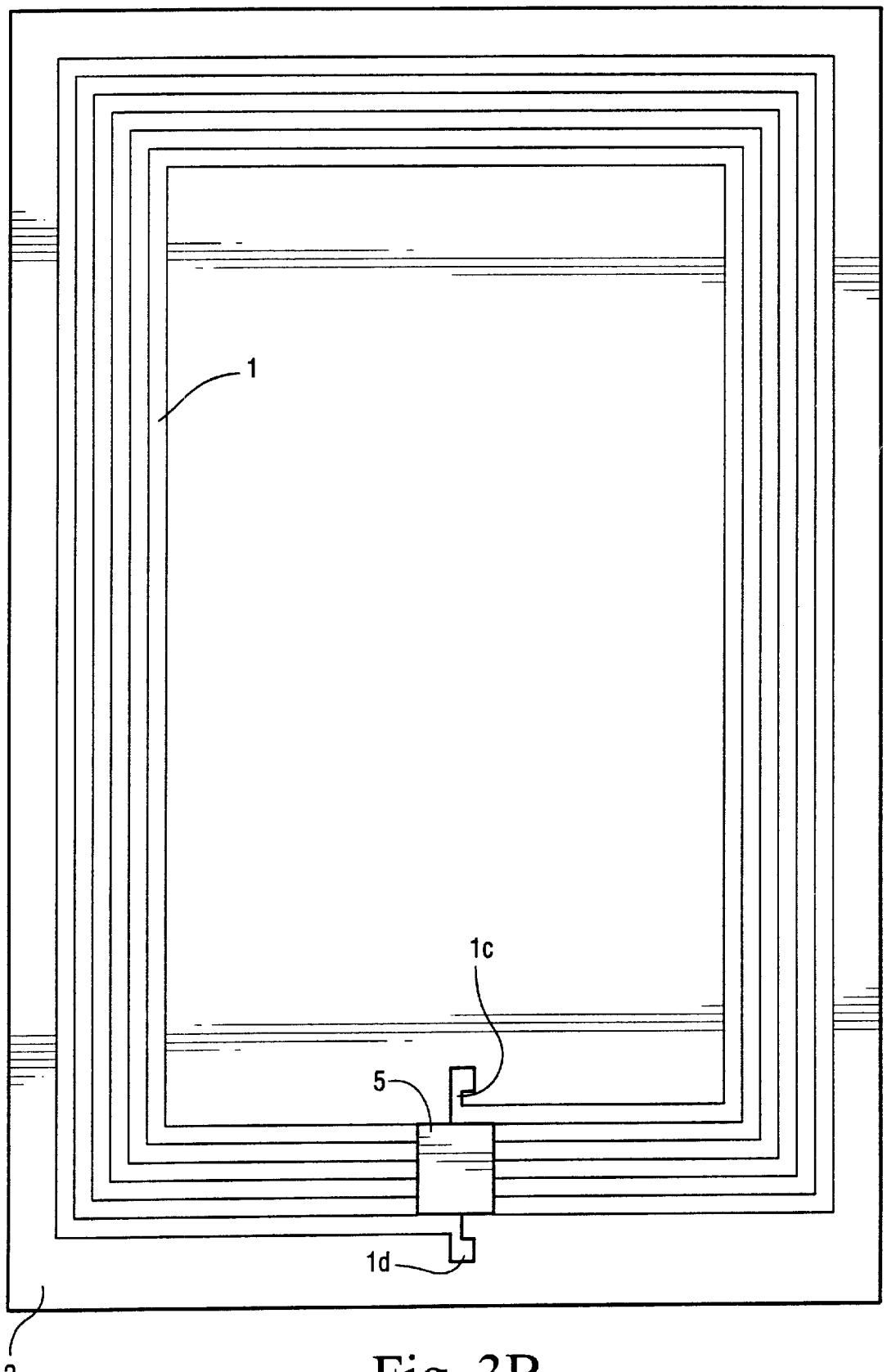
Figure 3C:
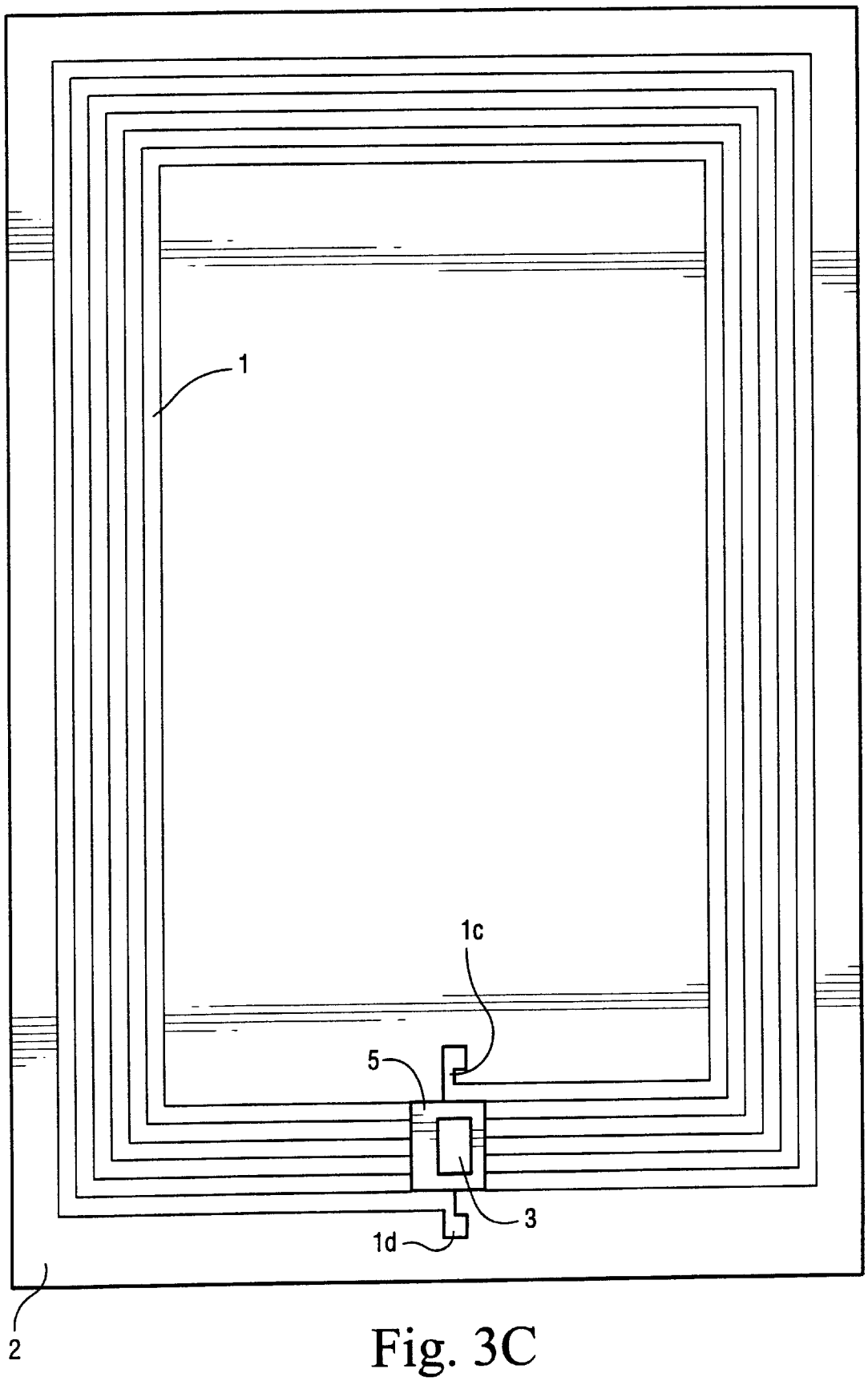
Figure 3D:
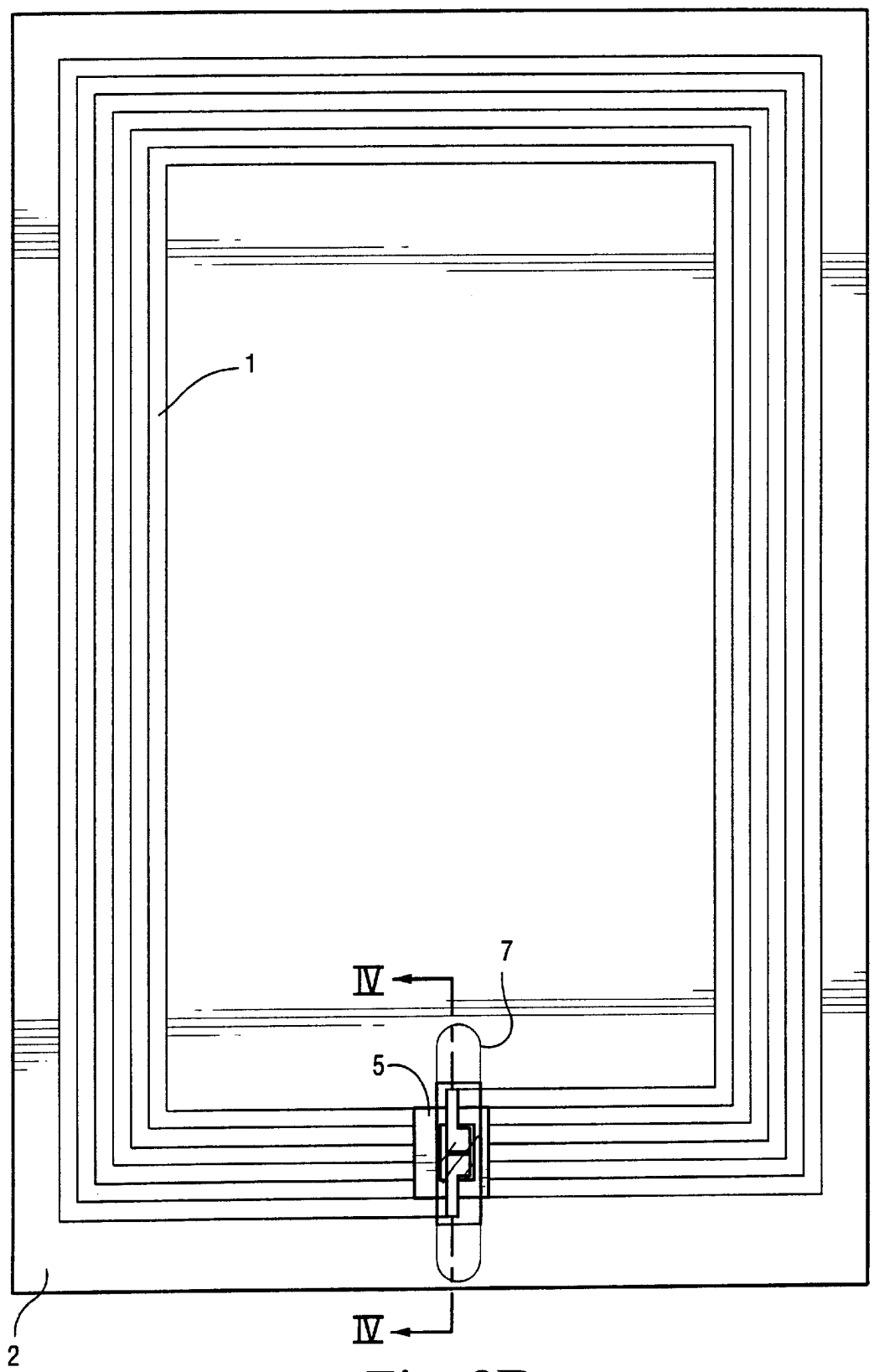
Figure 4:
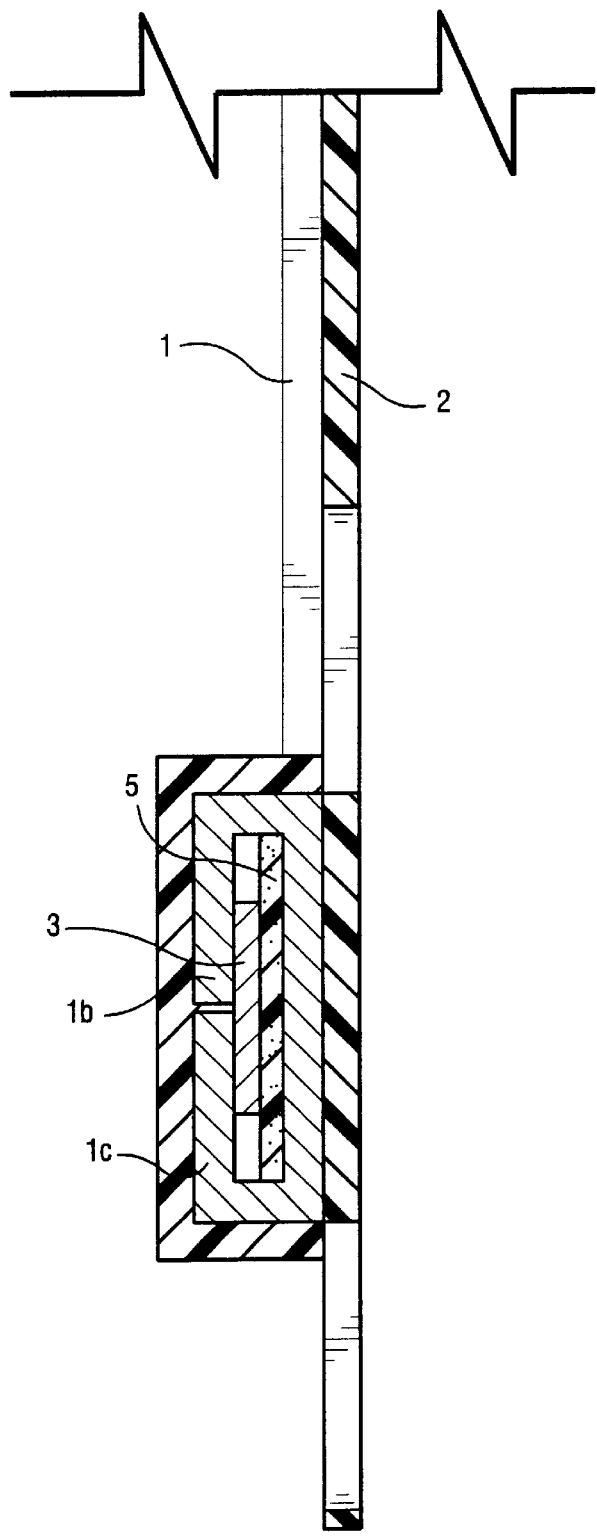
FIG. 4 is a cross-sectional view along section line IV—IV of FIG. 3D.

As illustrated in FIGS. 3D and 4, the RFID inlay includes an antenna 1 disposed on a substrate 2. The antenna 1 includes a plurality of spiral turns and integrally connected end portions 1c, 1d. A non-conductive insulator 5 is disposed on a portion of the spiral turns and an IC chip 3 is arranged on the non-conductive insulator 5. The end portion 1c is integrally connected to the innermost spiral turn and projects toward the outermost spiral turn to cross over some of the inner spiral turns. The end portion 1d is integrally connected to the outermost spiral turn and projects toward the innermost spiral turn to cross over some of the outer spiral turns. The sets of spiral turns crossed by the end portions 1c, 1d may be mutually exclusive. The end portions 1c, 1d are separated from the spiral turns that each end portion crosses by the non-conductive insulator 5.

As illustrated in FIG. 3A, the first step in constructing the RFID inlay accordineg to the another exemplary embodiment of the present invention is to dispose (e.g., print or etch) the electrically conductive antenna 1 onto the substrate 2. The antenna 1 including the spiral turns and integrally connected end portions 1c, 1d form a single, continuous trace.

As illustrated in FIG. 3B, the non-conductive insulator 5 such as a PSA or anisotropic adhesive is applied on a portion of the spiral turns. This portion is adjacent to the end portions 1c, 1d. Additional "underfill" adhesive may also be applied.

As illustrated in FIG. 3C, the IC chip 3 is placed on the insulator 5. The insulator 5 thus prevents the IC chip 3 from contacting those spiral turns over which the IC chip 3 is positioned. The electrical connections of the IC chip 3 face the upward direction (i.e., the direction away from the substrate) so that the end portions 1c, 1d can later be directly connected to the IC chip 3.

As illustrated in FIGS. 3D and 4, the end portions 1c, 1d are either cut out or partially punched out and folded over some of the spiral turns. The end portions 1c, 1d are cut out or punched out by cutting completely or partially through the substrate 2 as illustrated by lines 7. The end portion 1c is folded over the inner spiral turns of the antenna starting from the innermost spiral turn with which the end portion 1c is integrally connected and projecting toward the outermost spiral turn. The end portion 1d is folded over the outer spiral turns of the antenna starting from the outermost spiral turn with which the end portion 1d is integrally connected and projecting toward an innermost spiral turn. Those portions of the substrate 2 which are partially or completely cut through (as illustrated by line 7) are folded along with folded end portions 1c, 1d. The inner group of spiral turns crossed by the end portion 1c may be mutually exclusive from the outer group of spiral turns crossed by the end portion 1d. The end portions 1c, 1d are both folded onto the side of the substrate 2 on which the spiral turns are disposed. The non-conductive insulator 5 is arranged between the end portions 1c, 1d and the respective spiral turns crossed by the end portions 1c, 1d to prevent a short in the antenna 1. By folding the end portions 1c, 1d over respective spiral turns of the antenna 1, the end portions 1c, 1d each forms an electrical bridge over the spiral turns.

After the end portions 1c, 1d are folded, the end portions 1c, 1d are directly connected to the IC chip 3, although not directly to each other. The connections are preferably made using conductive adhesive or solder.

FIGS. 5A–5C and 6–7 illustrate a method of constructing an RFID inlay in accordance with yet another embodiment of the present invention. Elements which are the same or similar in nature are labeled using the same reference numerals in previous embodiment(s). Only the differences from previous embodiment(s) will be discussed in detail.

Figure 5A:
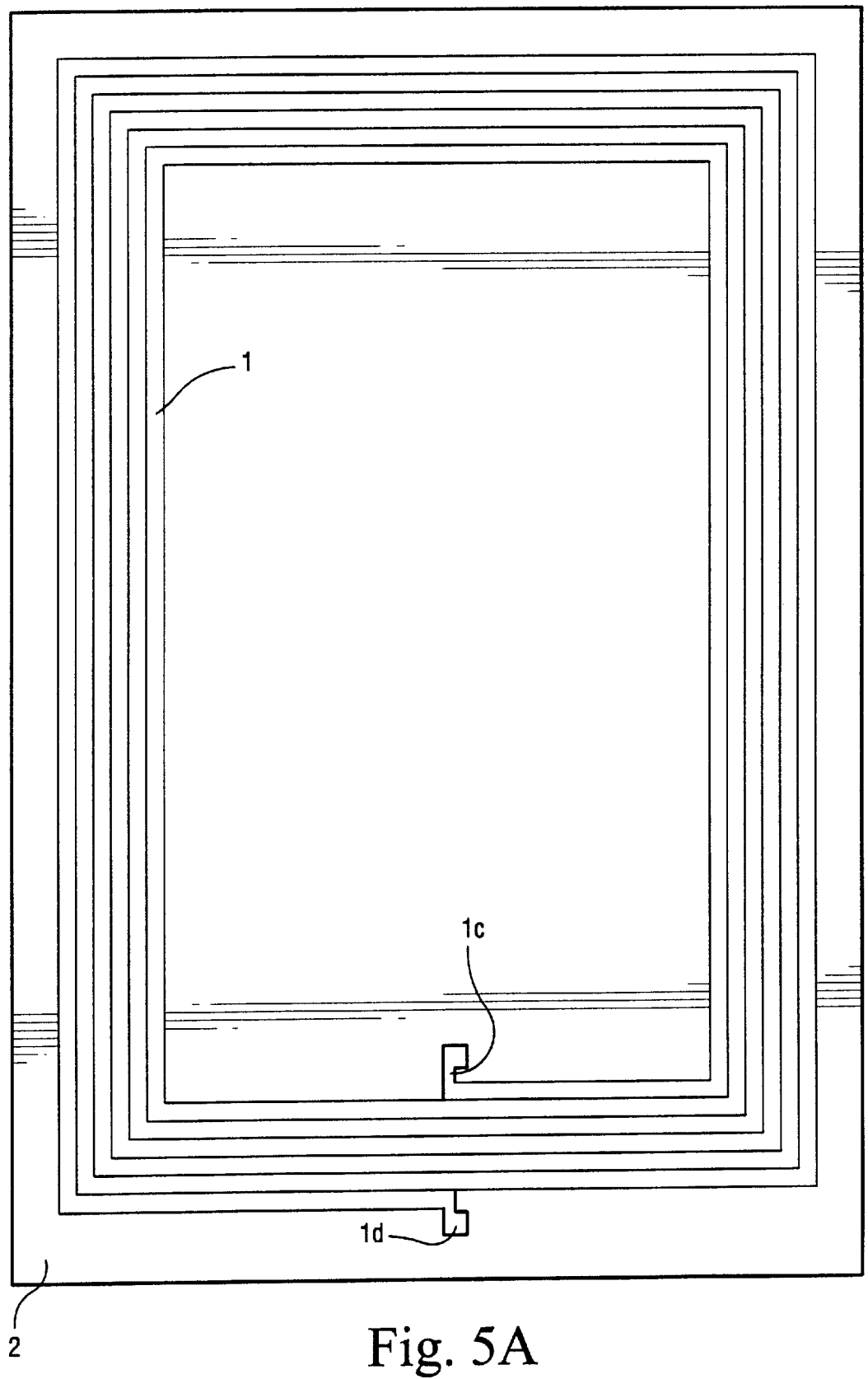
FIGS. 5A–5C illustrate plan views of one side of an RFID inlay as it is constructed in accordance with an exemplary embodiment of the present invention.

As illustrated in FIG. 5A, the first step in constructing the RFID inlay according to the yet another exemplary embodiment of the present invention is disposing an electrically conductive antenna 1 including end portions 1c, 1d onto a substrate 2. The antenna 1 including spiral turns and integrally connected end portions 1c, 1d form a single, continuous trace. The step disclosed in FIG. 5A is therefore identical to the step in the previous embodiment discussed in conjunction with FIG. 3A.

Figure 5B:
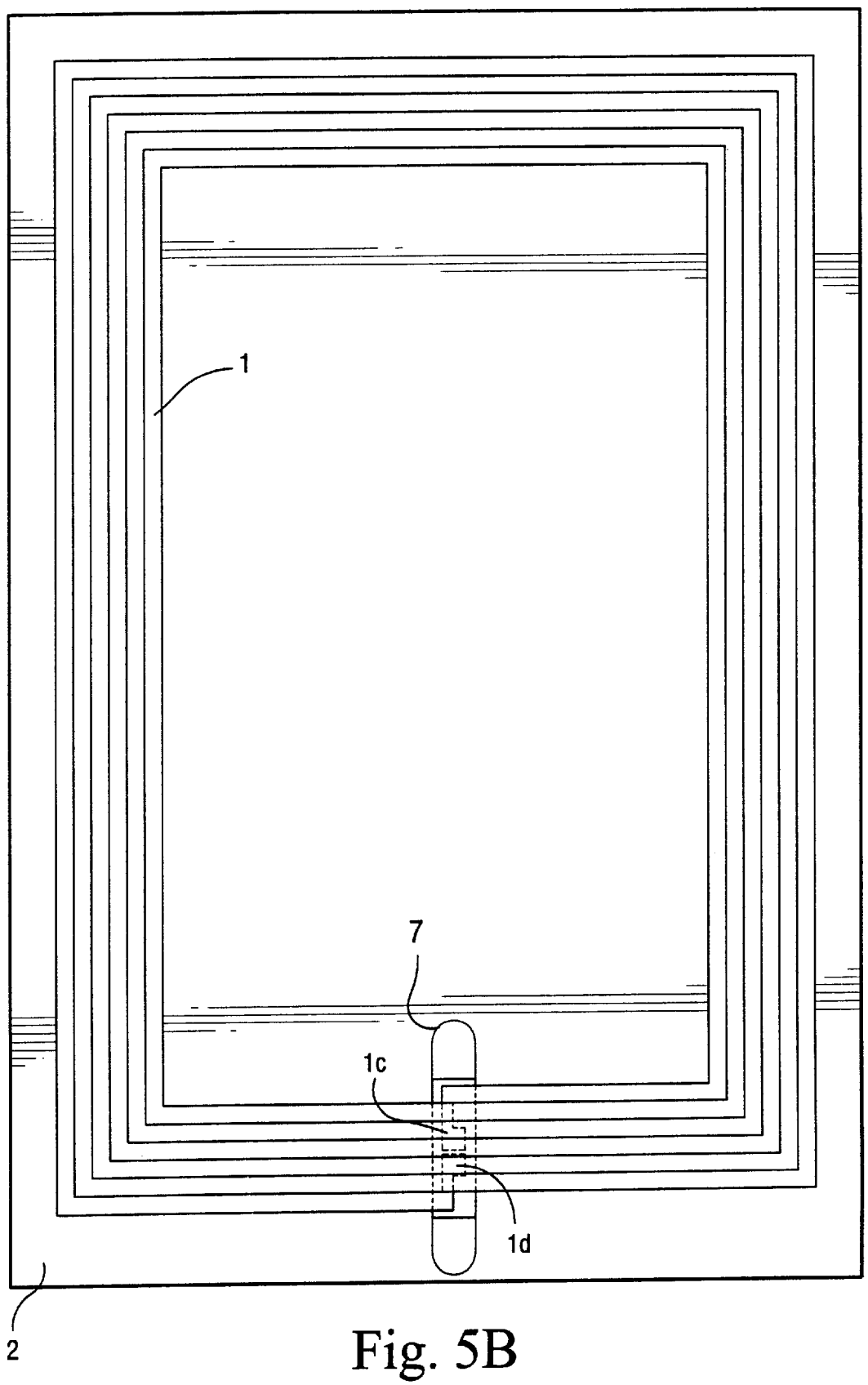
Figure 6:
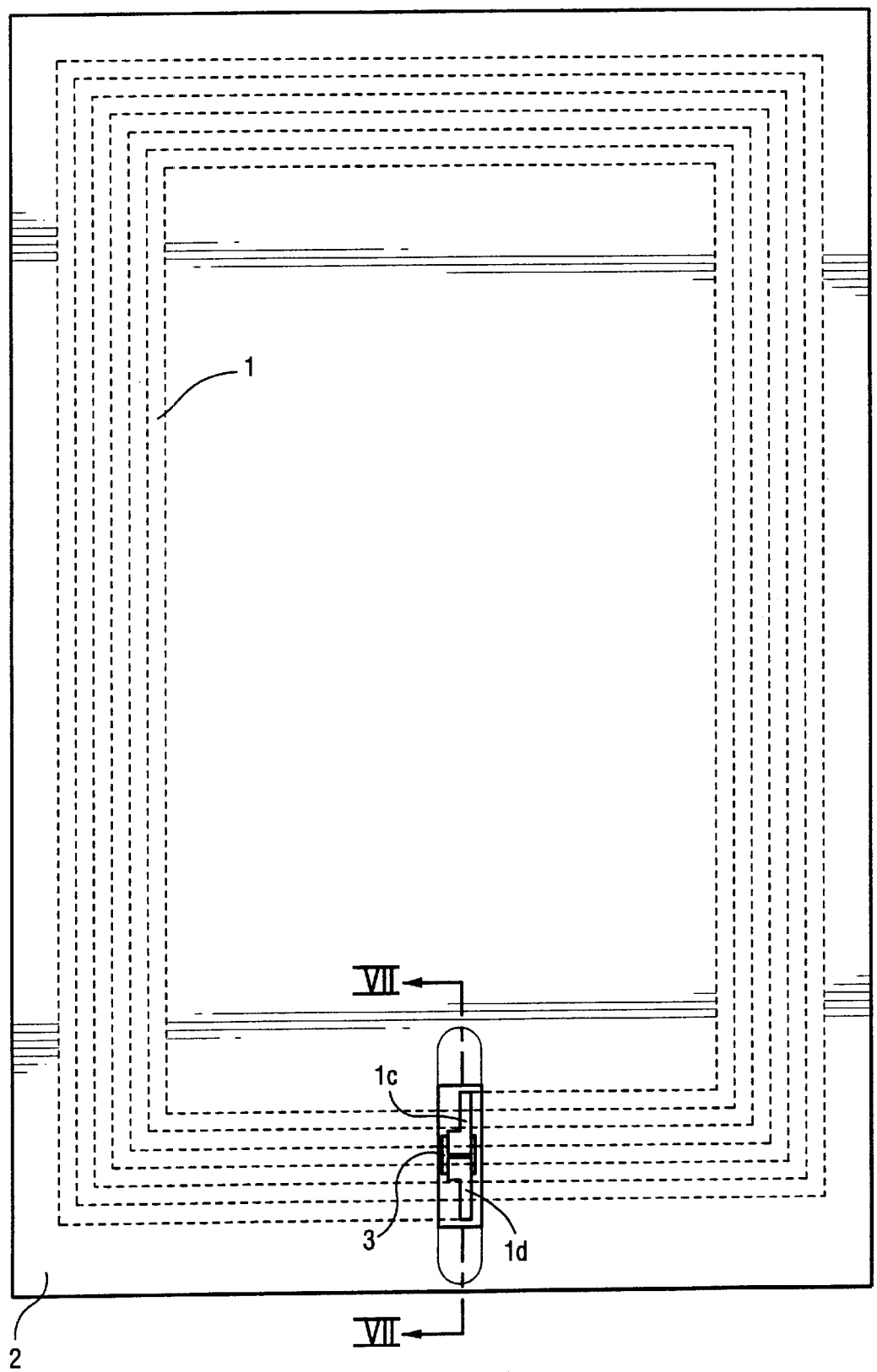
FIG. 6 illustrates a plan view of the other side of the RFID inlay illustrated in FIG. 5C.
Figure 7:
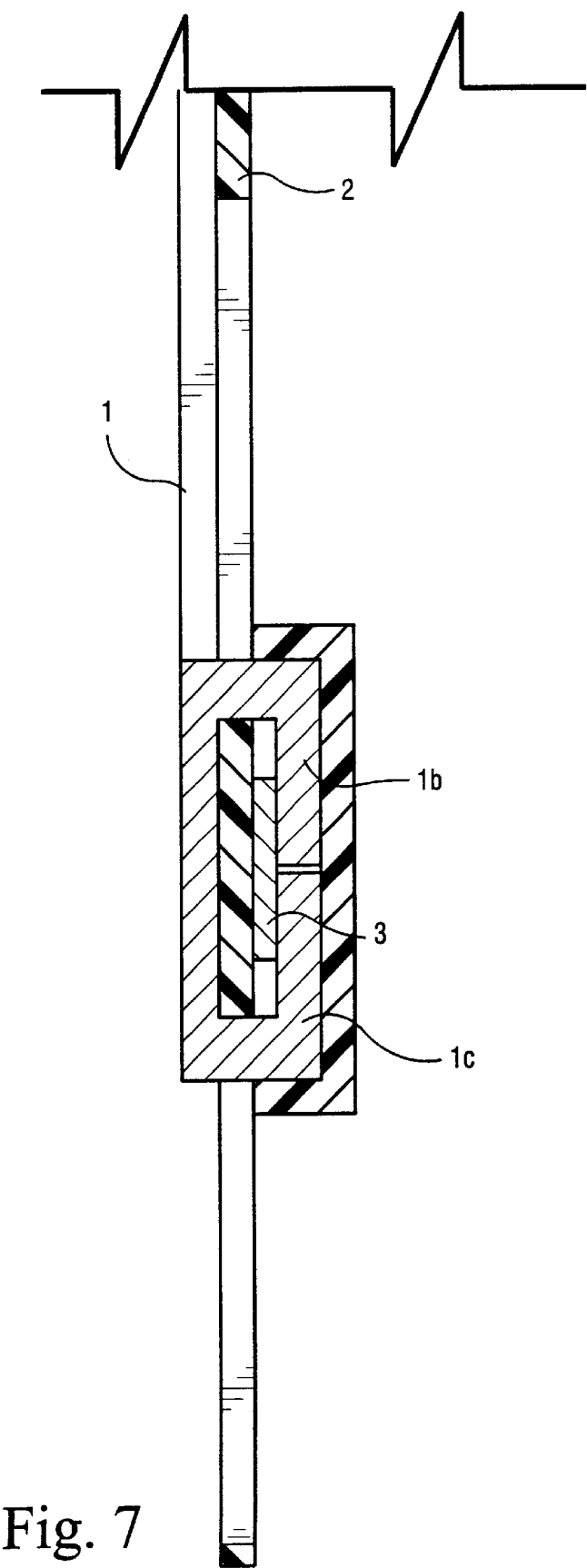
FIG. 7 is a cross-sectional view along section line VII—VII of FIG. 6.

As illustrated in FIGS. 5B and 6, the end portions 1c, 1d are either cut out or punched out by partially or completely cutting through the portion of the substrate 2 around three sides of each portion 1c, 1d as illustrated by line 7. The end portions 1c, 1d are then made to project through respective holes in the substrate 2 and folded over the spiral turns on the side of the substrate 2 on which the spiral turns of the antenna 1 are not disposed (hereinafter, the "non-spiral turns side" of the substrate). Specifically, the end portion 1c is folded onto the non-spiral turns side of the substrate 2 over the inner spiral turns of the antenna 1 starting from the innermost spiral turn. The end portion 1d is folded on the non-spiral turns side over the outer spiral turns of the antenna 1 starting from the outermost spiral turn. The portions of the substrate 2 that have been cut are also folded along with the end portions 1c, 1d. The inner group of spiral turns crossed by the end portion 1c may be mutually exclusive from the outer group of spiral turns crossed by the end portion 1d.

Figure 5C:
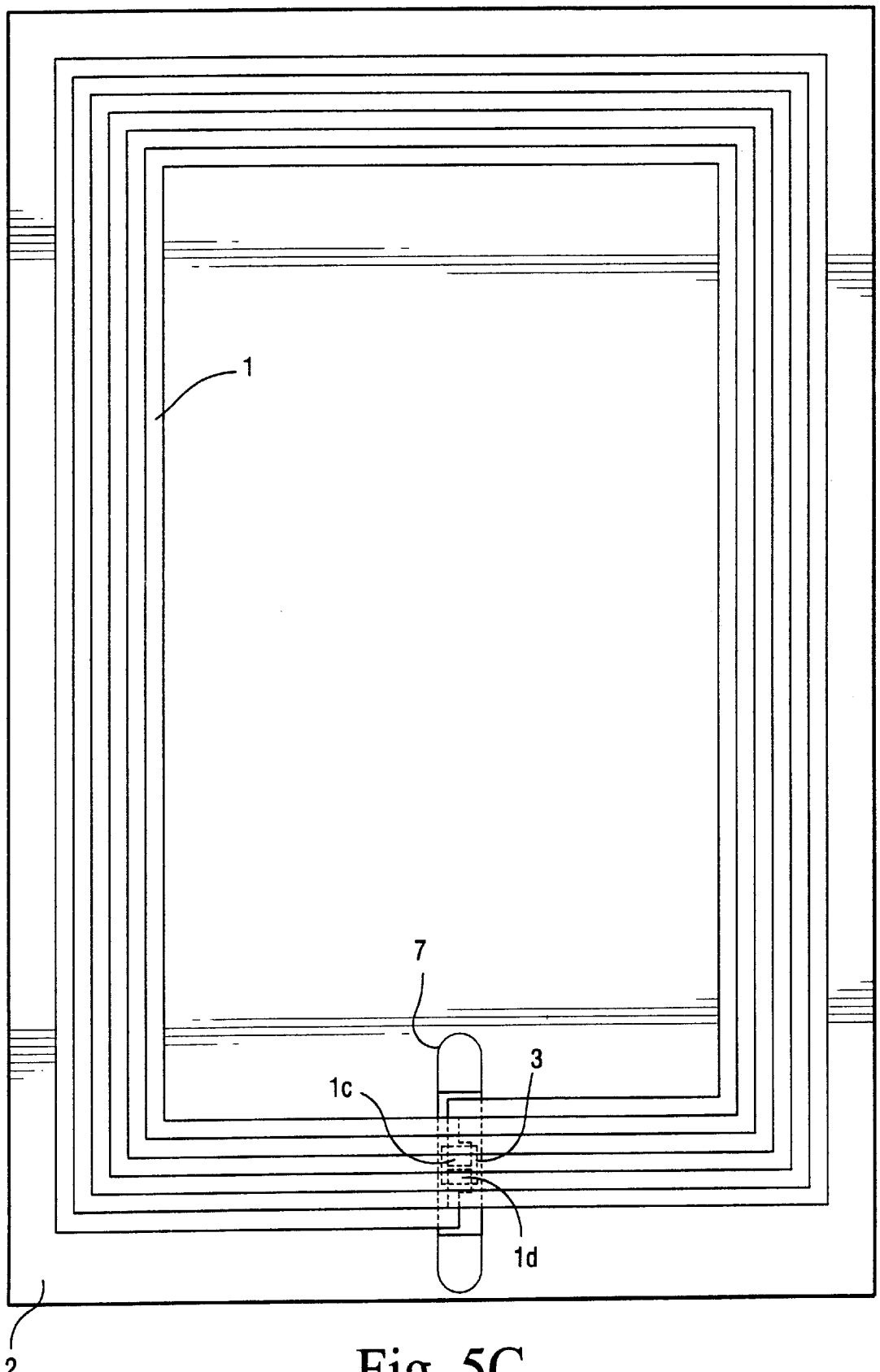

As illustrated in FIGS. 5C and 6, the IC chip 3 is electrically connected to the end portions 1c, 1d on the non-spiral turns side of the substrate 2. The IC chip 3 and/or the end portions 1c, 1d may optionally be held in place on the non-spiral turns side of the substrate 2 by an adhesive (not shown).

While the present invention discussed in the forgoing exemplary embodiments are used in RFID tags, it will be appreciated that the concepts of the present invention, in particular constructing an electrical bridge using an integrally formed end portion, could be used in other applications such as circuit board manufacturing. The bridge may enable electrical connections to be made without requiring multiple layers and costly "vias" in the circuit board.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radio frequency identification (RFID) tag comprising:
   a substrate;
   a continuous antenna having a plurality of spiral turns and an end portion that is integral with the spiral turns, the spiral turns being disposed on the substrate and the end portion crossing over at least one of the spiral turns; and
   an integrated circuit coupled to the substrate and electrically connected to the antenna.

2. The tag as in claim 1 further comprising non-conductive insulation arranged between the end portion and the at least one spiral turn that the end portion crosses.

3. The tag as in claim 1 further comprising an electrical trace disposed on the substrate adjacent to an outermost spiral turn of the antenna.

4. The tag as in claim 1 wherein the end portion is integrally connected to an innermost spiral turn and extends toward an outermost spiral turn to cross over at least some of the spiral turns.

5. The tag as in claim 4 wherein the end portion crosses over all of the spiral turns by extending from the innermost spiral turn to the outermost spiral turn and is connected to one end of an electrical trace that is disposed on the substrate adjacent to the outermost spiral turn, the other end of the electrical trace being connected to the integrated circuit.

6. The tag as in claim 5 further comprising non-conductive insulation arranged between the end portion and the spiral turns of the end portion crosses.

7. The tag as in claim 1, wherein the integrated circuit is coupled to the substrate at a location outside of at least all of spiral turns inside the outermost spiral turn.

8. A radio frequency identification (RFID) tag comprising:
   a substrate;
   a continuous antenna including a plurality of spiral turns, a first end portion and a second end portion, the first and second end portions being integral with the spiral turns; and
   an integrated circuit electrically connected to the antenna;
   the spiral turns of the antenna being disposed on the substrate, the first end portion crossing over at least a first one of the spiral turns, and a second end portion crossing over at least a second one of the spiral turns.

9. The tag as in claim 8 wherein the first end portion is integrally connected to an innermost spiral turn of the antenna and extends toward an outermost spiral turn of the antenna.

10. The tag as in claim 8 wherein the second end portion is integrally connected to an outermost spiral turn of the antenna and extends toward an innermost spiral turn of the antenna.

11. The tag as in claim 9 wherein the second end portion is integrally connected to an outermost spiral turn of the antenna and extends toward an innermost spiral turn of the antenna.

12. The tag as in claim 8 further comprising non-conductive insulation which is arranged between the first end portion and the at least a first one of the spiral turns and between the second end portion and the at least a second one of the spiral turns.

13. The tag as in claim 8 further comprising non-conductive insulation which is arranged between the integrated circuit and at least some of the spiral turns.

14. The tag as in claim 8 wherein the first end portion crosses over the at least a first one of the spiral turns on a side of the substrate on which the spiral turns of the antenna are not disposed and the second end portion crosses the at least a second one of the spiral turns on the side of the substrate on which the spiral turns of the antenna are not disposed.

15. The tag as in claim 14 wherein the integrated circuit is disposed on the side of the substrate on which the spiral turns of the antenna are not disposed and the integrated circuit is connected to both the first and second end portions.

16. A method of making an RFID tag comprising:

providing a substrate;

integrally forming a continuous antenna having a plurality of spiral turns and an end portion;

disposing the spiral turns on the substrate and folding the end portion of the antenna so that the end portion crosses over at least one of the spiral turns; and connecting an integrated circuit to the antenna.

17. The method as in claim 16 further comprising arranging non-conductive insulation between the end portion and the at least one spiral turn that the end portion crosses.

18. The method as in claim 17 further comprising disposing an electrical trace on the substrate adjacent to an outermost spiral turn of the antenna.

19. The method as in claim 17 wherein the end portion is integrally connected to an innermost spiral turn and extends toward an outermost spiral turn to cross over the at least one spiral turn.

20. The method as in claim 19 wherein the end portion crosses over all of the spiral turns by extending from the innermost spiral turn to the outermost spiral turn and is connected to one end of an electrical trace that is disposed on the substrate and adjacent to the outermost spiral turn, the other end of the electrical trace being connected to the integrated circuit.

21. The method as in claim 20 further comprising arranging non-conductive insulation arranged between the end portion and the spiral turns of the antenna the end portion crosses.

22. The method of claim 16, wherein the integrated circuit is coupled to the substrate at a location outside of at least all of spiral turns inside the outermost spiral turn.

23. A method making a radio frequency identification (RFID) tag comprising:

providing a substrate;

integrally forming a continuous antenna having a plurality of spiral turns, a first end portion and a second end portion;

disposing the antenna on the substrate;

folding the first end portion so that the first end portion crosses over at least a first one of the spiral turns and folding the second end portion so that the second end portion crosses over at least a second one of the spiral turns; and electrically connecting an integrated circuit to the antenna.

24. The method as in claim 23 wherein the first end portion is integrally connected to an innermost spiral turn of the antenna and extends toward an outermost spiral turn of the antenna.

25. The method as in claim 23 wherein the second end portion is integrally connected to an outermost spiral turn of the antenna and extends toward an innermost spiral turn of the antenna.

26. The method as in claim 24 wherein the second end portion is integrally connected to an outermost spiral turn of the antenna and extends toward an innermost spiral turn of the antenna.

27. The method as in claim 23 further comprising arranging non-conductive insulation between the first end portion and the at least a first one of the spiral turns and between the second end portion and the at least a second one of the spiral turns.

28. The method as in claim 23 wherein the integrated circuit is arranged on a side of the substrate on which the spiral turns are disposed and over at least some of the spiral turns, and non-conductive insulation is arranged between the integrated circuit and the at least some of the spiral turns.

29. The method as in claim 23 wherein the first end portion crosses over the at least a first one of the spiral turns on a side of the substrate on which the spiral turns of the antenna are not disposed and the second end portion crosses the at least a second one of the spiral turns on a side of the substrate on which the spiral turns of the antenna are not disposed.

30. The method as in claim 29 wherein the integrated circuit is disposed on the substrate on which the spiral turns of the antenna are not disposed and the integrated circuit is connected to both the first and second end portions.

* * * * *